United States Patent [19]

Budinger et al.

[11] 4,102,947

[45] Jul. 25, 1978

[54] RUBBER-MODIFIED ACRYLONITRILE COPOLYMERS PREPARED IN AQUEOUS SUSPENSION

[75] Inventors: Bruce O. Budinger, Macedonia; June T. Duke, Chagrin Falls, both of Ohio

[73] Assignee: The Standard Oil Company, Cleveland, Ohio

[21] Appl. No.: 786,236

[22] Filed: Apr. 11, 1977

[51] Int. Cl.$^2$ .......................................... C08F 279/04
[52] U.S. Cl. .............................. 260/879; 260/878 R; 260/880 R; 526/212
[58] Field of Search .............. 260/878 R, 879, 880 R; 526/210, 211, 212

[56] References Cited

U.S. PATENT DOCUMENTS

| | | | |
|---|---|---|---|
| 3,370,105 | 2/1968 | De Bell | 260/879 |
| 3,436,440 | 4/1969 | Abe | 260/879 |
| 3,528,951 | 9/1970 | Kohn | 526/212 |
| 3,786,115 | 1/1974 | Osuga | 260/880 R |
| 3,947,527 | 3/1976 | Li | 260/879 |
| 3,950,454 | 4/1976 | Hensley | 260/879 |
| 3,984,499 | 10/1976 | Wardlow | 260/878 R |
| 3,997,628 | 12/1976 | Giddings | 260/876 R |

*Primary Examiner*—Paul R. Michl
*Attorney, Agent, or Firm*—John F. Jones; Larry W. Evans

[57] ABSTRACT

Impact-resistant rubber-modified high acrylonitrile copolymers are prepared in aqueous suspension using a preformed rubbery polymer latex and a lower alcohol.

5 Claims, No Drawings

RUBBER-MODIFIED ACRYLONITRILE COPOLYMERS PREPARED IN AQUEOUS SUSPENSION

The present invention relates to a process for preparing impact-resistant rubber-modified acrylonitrile copolymers, and more particularly pertains to the suspension polymerization process in a water-alcohol medium whereby rubber-modified acrylonitrile copolymers having good impact resistance are prepared.

The impact-resistant copolymers of this invention are prepared in aqueous suspension in the presence of from 5 to 35 parts by weight of an alcohol having from 1 to 4 carbon atoms. Most preferred are ethanol and isopropanol. It is also preferred that there be from 1 to 40 parts by weight based on the weight of monomers of the alcohol present in the polymerization process.

The rubber-modified nitrile polymers to which this invention pertains are resinous polymers produced by polymerizing a major proportion of a monounsaturated nitrile, such as acrylonitrile, and a minor proportion of another monovinyl monomer component copolymerizable with said nitrile in an aqueous medium in the presence of a preformed diene rubber which may be a homopolymer or a copolymer of a conjugated diene rubber. Some of such polymers have been previously described in U.S. Pat. Nos. 4,006,211; 3,997,628; 3,984,499; 3,950,454; 3,947,527; 3,586,737; and 3,426,102.

The olefinically unsaturated nitriles useful in the present invention are the alpha,beta-olefinically unsaturated mononitriles having the structure

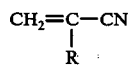

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile.

The other monovinyl monomer component copolymerizable with the olefinically unsaturated nitriles which are useful in this invention includes one or more of the vinyl aromatic monomers, esters of olefinically unsaturated carboxylic acids, vinyl esters, vinyl ethers, alpha-olefins, indene, and others.

The vinyl aromatic monomers include styrene, alpha-methyl styrene, the vinyl toluenes, the vinyl xylenes, and the like. Most preferred is styrene.

The esters of olefinically unsaturated carboxylic acids include those having the structure

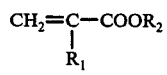

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms and having the structure

wherein R' and R" are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

Indene and coumarone are useful monomers in this invention. Indene is preferred.

The preformed rubbery polymers useful in the present invention are rubbery polymers of a conjugated diene monomer selected from the group consisting of butadiene and isoprene and optionally at least one comonomer selected from the group consisting of styrene, a nitrile monomer having the structure

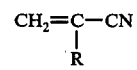

wherein R has the foregoing designation, and an ester having the structure

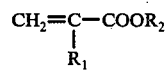

wherein $R_1$ and $R_2$ have the foregoing designations, said rubbery polymer containing from 50 to 100% by weight of polymerized conjugated diene and from 0 to 50% by weight of comonomer.

The polymers useful in the present invention are those prepared by the polymerization of 100 parts by weight of (A) at least 50% by weight of at least one nitrile having the structure

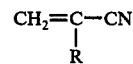

wherein R has the foregoing designation and (B) up to 50% by weight based on the combined weight of (A) and (B) of at least one member selected from the group consisting of (1) a vinyl aromatic monomer selected from the group consisting of styrene, alpha-methyl styrene, the vinyl toluenes, and the vinyl xylenes; (2) an ester having the structure

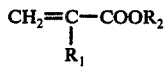

wherein $R_1$ and $R_2$ have the foregoing designations; (3) an alpha-olefin having the structure

wherein R' and R" have the foregoing designations; (4) a vinyl ether selected from the group consisting of methyl vinyl ether, ethyl vinyl ether, the propyl vinyl ethers, and the butyl vinyl ethers; (5) a vinyl ester selected from the group consisting of vinyl acetate, vinyl propionate, and the vinyl butyrates; and (6) at least one member selected from the group consisting of indene and coumarone, in the presence of from 1 to 40 parts by weight of (C) a rubbery polymer of a conjugated diene monomer selected from the group consisting of butadiene and isoprene and optionally at least one comonomer selected from the group consisting of styrene, a nitrile having the structure

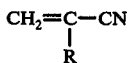

wherein R has the foregoing designation, and an ester having the structure

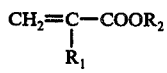

wherein $R_1$ and $R_2$ have the foregoing designations, said rubbery polymer containing from 50 to 100% by weight of polymerized conjugated diene and from 0 to 50% by weight of comonomer.

Preferably, a component (A) should be present in from about 60 to 90% by weight based on the combined weight of (A) and (B), and the rubbery polymer (C) should contain more than 50% by weight of conjugated diene and more preferably from 60 to 90% by weight of conjugated diene.

The polymeric products of the present invention are thermoplastic materials which can be thermoformed into a wide variety of useful articles in any of the conventional ways employed with known thermoplastic polymeric materials such as by extrusion, milling, molding, drawing, blowing, injecting, and the like. These polymers have excellent solvent resistance and their impact strength and low permeability to gases and vapors make them very useful in the packaging industry, and they are particularly useful in the manufacture of bottles, film, and other types of containers for liquids and solids.

The useful range of notched Izod impact strength for resins within the scope of the present invention is above 0.25 foot pounds per inch of notch.

The following examples will further illustrate the present invention in greater detail; however, it is to be understood that the scope of this invention is not to be limited by these examples. In the examples, the amounts of ingredients are given in parts by weight unless otherwise specified.

EXAMPLE 1

A. A rubber-modified terpolymer of acrylonitrile-methyl acrylate-methyl methacrylate was prepared in aqueous suspension using the following ingredients:

| Ingredient | Parts |
| --- | --- |
| acrylonitrile | 75 |
| methyl acrylate | 15 |
| methyl methacrylate | 10 |
| isopropanol | 25 |
| water | 375 |
| limonene dimercaptan | 0.5 |
| azobisdimethylvaleronitrile | 0.4 |
| 30% solids 70/30 butadiene/acrylonitrile elastomer latex (solids basis) | 10 |

The polymerization was carried out at 55° C for about 6 hours. The resin was obtained by filtration and dried in 77% yield. The dried resin was found to have a notched Izod impact strength of 0.72 foot pounds per inch of notch.

B. The procedure of A of this example was repeated using 5 parts instead of the 10 parts (solids basis) of the 70/30 butadiene/acrylonitrile rubber latex. The resulting resin was found to have a notched Izod impact strength of 0.5 foot pounds per inch of notch and a Brabender plasticorder torque of 1740 meter grams at 230° C and 35 rpm.

C. A repeat of B of this example using a conventional suspension polymerization procedure in which 0.15 part of carboxymethyl cellulose was used instead of the isopropanol. The resulting resin which is outside the scope of this invention was found to have an Izod impact strength of 0.17 foot pounds per inch of notch and a Brabender plasticorder torque of 2960 meter grams at 230° C and 35 rpm.

D. The procedure of A of this example was repeated except that no rubber was included, and 0.10 part of potassium persulfate and 0.05 part of sodium bisulfite were used in place of azobisdimethylvaleronitrile as an ingredient to produce a resin which is outside the scope of this invention having a notched Izod impact strength of 0.18 foot pounds per inch of notch and a Brabender plasticorder torque of 760 meter grams at 230° C.

EXAMPLE 2

A. A rubber-modified terpolymer of acrylonitrile-styrene-methyl methacrylate was prepared in aqueous suspension using the following ingredients:

| Ingredient | Parts |
| --- | --- |
| acrylonitrile | 75 |
| styrene | 15 |
| methyl methacrylate | 10 |
| isopropanol | 25 |
| water | 375 |
| limonene dimercaptan | 1.0 |
| azobisdimethylvaleronitrile | 0.20 |
| latex of a 75 butadiene-25 styrene rubber (solids basis) | 5 |

Initially, only 0.1 part of azobisdimethylvaleronitrile, 50 parts of acrylonitrile, 3 parts of styrene and 1 part of methyl methacrylate were added to the rubber-alcohol-water mixture containing the limonene dimercaptan modifier. The balance of the acrylonitrile-styrene-methyl methacrylate monomer mixture was fed into the reactor linearly over 5 hours, the balance of the azobis-dimethylvaleronitrile being added at 1 hour. The final product was worked up and vacuum oven dried. The resulting resin was found to have a notched Izod impact strength of 0.47 foot pounds per inch of notch.

B. A repeat of A of this example using 0.1 part of carboxymethyl cellulose and 0.05 part of polyvinyl pyrrolidone instead of the isopropanol gave a resin which is outside the scope of this invention and had a notched Izod impact strength of 0.23 foot pounds per inch of notch.

EXAMPLE 3

The procedure of Example 1A was repeated using 75 parts of acrylonitrile and 25 parts of methyl acrylate as the monomer component. The final resin was found to have an Izod impact strength of 3.04 foot pounds per inch of notch.

EXAMPLE 4

The procedure of Example 1A was repeated using as the monomer component 75 parts of acrylonitrile, 20 parts of methyl acrylate, 5 parts of indene and with 5 parts of elastomer. The resulting resin was found to have an Izod impact strength of 0.40 foot pounds per inch of notch.

EXAMPLE 5

A repeat of Example 1A using ethanol in place of the isopropanol gave a resin which had a notched Izod impact strength of 0.40 foot pounds per inch of notch.

EXAMPLE 6

The procedure of Example 2A was repeated using 25 parts of styrene and no methyl methacrylate. The resulting resin had a notched Izod impact strength of 0.36 foot pounds per inch of notch.

We claim:

1. The process comprising polymerizing in an aqueous suspension in the substantial absence of molecular oxygen at a temperature in the range of from 0° to 100° C and in the presence of a free radical initiator and an alcohol containing from 1 to 4 carbon atoms 100 parts by weight of
    (A) at least 50% by weight of at least one nitrile having the structure

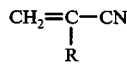

wherein R is hydrogen, a lower alkyl group having from 1 to 4 carbon atoms, or a halogen, and
    (B) up to 50% by weight based on the combined weight of (A) and (B) of at least one member selected from the group consisting of (1) a vinyl aromatic monomer selected from the group consisting of styrene, alpha-methyl styrene, the vinyl toluenes, and the vinyl xylenes;
    (2) an ester having the structure

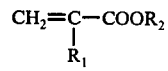

wherein $R_1$ is hydrogen, an alkyl group having from 1 to 4 carbon atoms, or a halogen, and $R_2$ is an alkyl group having from 1 to 6 carbon atoms;
    (3) an alpha-olefin having the structure

wherein $R'$ and $R''$ are alkyl groups having from 1 to 7 carbon atoms;
    (4) a vinyl ether selected from the group consisting of methyl vinyl ether, ethyl vinyl ether, the propyl vinyl ethers, and the butyl vinyl ethers;
    (5) a vinyl ester selected from the group consisting of vinyl acetate, vinyl propionate, and the vinyl butyrates; and
    (6) at least one member selected from the group consisting of indene and coumarone,
    in the presence of from 1 to 40 parts by weight of
    (C) a rubbery polymer of a conjugated diene monomer selected from the group consisting of butadiene and isoprene and optionally at least one comonomer selected from the group consisting of styrene, a nitrile having the structure

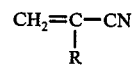

wherein R has the foregoing designation, and an ester having the structure

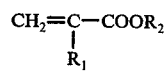

wherein $R_1$ and $R_2$ have the foregoing designations, said rubbery polymer containing from 50 to 100% by weight of polymerized conjugated diene and from 0 to 50% by weight of comonomer.

2. The process of claim 1 wherein (A) is acrylonitrile.
3. The process of claim 2 wherein (C) is a butadiene-acrylonitrile rubbery polymer.
4. The process of claim 2 wherein (C) is a butadiene-styrene rubbery polymer.
5. The process of claim 2 wherein the alcohol is a member selected from the group consisting of ethanol and isopropanol.